US012676511B2

(12) United States Patent
Shrivastava

(10) Patent No.: US 12,676,511 B2
(45) Date of Patent: Jul. 7, 2026

(54) ULTRA-LOW POWER BEAMFORMING WIRELESS POWER TRANSFER SYSTEM

(71) Applicant: Northeastern University, Boston, MA (US)

(72) Inventor: Aatmesh Shrivastava, Weston, MA (US)

(73) Assignee: Northeastern University, Boston, MA (US)

( * ) Notice: Subject to any disclaimer, the term of this patent is extended or adjusted under 35 U.S.C. 154(b) by 79 days.

(21) Appl. No.: 18/734,603

(22) Filed: Jun. 5, 2024

(65) Prior Publication Data

US 2024/0322605 A1      Sep. 26, 2024

Related U.S. Application Data

(62) Division of application No. 17/861,603, filed on Jul. 11, 2022, now Pat. No. 12,034,310.

(60) Provisional application No. 63/221,694, filed on Jul. 14, 2021.

(51) Int. Cl.
| | |
|---|---|
| *H02J 50/00* | (2016.01) |
| *H01Q 3/22* | (2006.01) |
| *H02J 50/20* | (2016.01) |
| *H02J 50/40* | (2016.01) |
| *H02J 50/80* | (2016.01) |

(52) U.S. Cl.
CPC .............. *H02J 50/20* (2016.02); *H01Q 3/22* (2013.01); *H02J 50/40* (2016.02); *H02J 50/80* (2016.02)

(58) Field of Classification Search
CPC .................................. H02J 50/20; H02J 50/80
See application file for complete search history.

(56) References Cited

U.S. PATENT DOCUMENTS

| | | | |
|---|---|---|---|
| 6,597,228 | B1 | 7/2003 | Reichel |
| 9,826,537 | B2 | 11/2017 | Forenza et al. |
| 10,985,811 | B2 | 4/2021 | Forenza et al. |
| 2011/0190849 | A1 | 8/2011 | Faltys et al. |
| 2013/0023210 | A1 | 1/2013 | Rofougaran |
| 2019/0044392 | A1 | 2/2019 | Chowdhury et al. |
| 2019/0245389 | A1 | 8/2019 | Johnston et al. |
| 2019/0326970 | A1 | 10/2019 | Ma et al. |
| 2023/0026315 | A1 | 1/2023 | Shrivastava |
| 2023/0028864 | A1 | 1/2023 | Fan et al. |

OTHER PUBLICATIONS

Anechoic Chamber, Northeastern Facility. https://facilities.northeastern.edu/anechoic-chamber/.
Biosketch of Aatmesh Shrivastava. https://web.northeastern.edu/ecl/wp-content/uploads/2021/01/CV_External.pdf.
Bol et al., "Analysis, Modeling, and Design of a 2.45-GHz RF Energy Harvester for SWIPT IoT Smart Sensors," IEEE Journal of Solid-State Circuits, vol. 54, No. 10, pp. 2717-2729, Oct. 2019, doi: 10.1109/JSSC.2019.2914581.

(Continued)

*Primary Examiner* — Adi Amrany
(74) *Attorney, Agent, or Firm* — Foley Hoag LLP; Dana M. Gordon; Erik A. Huestis

(57) ABSTRACT

Wireless power transfer (WPT) efficiency is enhanced using an ultra-low power (ULP) distributed beamforming technique. A phase and frequency offset correction technique is used for beam-forming optimization, a backscattering communication technique is used to reduce power over-head, and a new rectifier and MPT method is used for high efficiency RF-to-DC conversion.

7 Claims, 11 Drawing Sheets

(56)                    References Cited

OTHER PUBLICATIONS

Calhoun et al., "A 1.5 nW, 32.768 KHz XTAL Oscillator Operational From a 0.3 V Supply," IEEE Journal of Solid-State Circuits, vol. 51, No. 3, pp. 686-696, Mar. 2016, doi: 10.1109/JSSC.2015.2512382.
Calhoun et al., "A 150nW, 5ppm/°C, 100kHz On-Chip clock source for ultra low power SoCs," Proceedings of the IEEE 2012 Custom Integrated Circuits Conference, San Jose, CA, 2012, pp. 1-4, doi: 10.1109/CICC.2012.6330699.
Chapman et al., "Comparison of Photovoltaic Array Maximum Power Point Tracking Techniques," IEEE Transactions on Energy Conversion, vol. 22, No. 2, pp. 439-449, Jun. 2007, doi: 10.1109/TEC.2006.874230.
Chen et al., "Wireless Energy and Information Transfer Tradeoff for Limited-Feedback Multiantenna Systems With Energy Beamforming" IEEE Transactions on Vehicular Technology, vol. 63, No. 1,; pp. 407-412 (2014).
Cho et al., A 5.2 mW IEEE 802.15.6 HBC Standard Compatible Transceiver With Power Efficient Delay-Locked-Loop Based BPSK Demodulator, IEEE Journal of Solid-State Circuits, vol. 50, No. 11, pp. 2549-2559 (2015).
Choi et al., "Received Power-Based Channel Estimation for Energy Beamforming in Multiple-Antenna RF Energy Transfer System" IEEE Transactions on Signal Processing, vol. 65, No. 6, pp. 1461-1476 (2017).
Chowdhury et al., "Design Optimization and Implementation for RF Energy Harvesting Circuits," IEEE Journal on Emerging and Selected Topics in Circuits and Systems, vol. 2, No. 1, pp. 24-33 (2012).
Datasheet of Eurocan Integrated GPSDO (GPSOCXO). http://www.jackson-labs.com/assets/downloads/GPSOCXO_Specsheet.pdf.
Datasheet of Laptech Precision OCXO series OS364-13. https://www.laptech.com/pdfs/OCXO_series_OS364-13_generic_data_sheet.pdf.
Datasheet of Pasternack Dual Junction Circulator, PE83lR1017. "Dual Junction Isolator with 40dB isolation from 2GHz to 4GHz, 50 Watts and SMA Female" https://www.pasternack.com/images/ProductPDF/PE83IR1017.pdf.
Datasheet of Powercast P2110 harvester chip. https://www.powercastco.com/wp-content/uploads/2016/11/p2110-datasheet-rev-b.pdf. (2017).
Divsalar et al., "Doppler-corrected differential detection of MPSK," IEEE Transactions on Communications, vol. 37, No. 2, pp. 99-109, Feb. 1989, doi: 10.1109/26.20075.
Du et al., "Improvement of global navigation satellite system signal acquisition using different grade inertial measurement units for high dynamic applications," IET Radar, Sonar & Navigation, vol. 8, No. 3, pp. 233-241, Mar. 2014, doi: 10.1049/iet-rsn.2012.0362.
Du et al., "Wirelessly Powered Sensor Networks: Power Allocation for Channel Estimation and Energy Beamforming" IEEE Transactions on Wireless Communications, vol. 19, No. 5, pp. 2987-3002, (2020).
Fan et al., "Energy Ball: Wireless Power Transfer for Batteryless Internet of Things through Distributed Bearnforming" Proceedings of ACM Interact. Mob. Wearable Ubiquitous Technol, vol. 2, No. 2, 22 pages (2018).
Gollakota et al., " LoRa Backscatter: Enabling The Vision of Ubiquitous Connectivity" Proc. ACM Interact. Mob. Wearable Ubiquitous Technol. 1, 3, Article 105 (Sep. 2017), 24 pages. DOI:https://doi.org/10.1145/3130970.
Henkel et al., "The Cyclic Prefix of OFDM/DMT An Analysis", International Zurich Seminar on Broadband Communications, Feb. 9-21, 2002, ETH Zurich.
Hsieh et al., "A 0.4V 13b 270kS/S SAR-ISDM ADC with an opamp-less time-domain integrator," IEEE International Solid—State Circuits Conference—(ISSCC), San Francisco, CA, 2018, pp. 240-242, doi: 10.1109/ISSCC.2018.8310273.
IEEE Standard for Information technology Telecommunications and information exchange between systems Local and metropolitan area networks-Specific requirements Part 11: Wireless LAN Medium Access Control (MAC) and Physical Layer (PHY) Specifications, IEEE Std 802.Nov. 2016 (Revision of JIEEE Std 802.11-2012) pp. 1-3534, Dec. 14, 2016.
IEEE Standard for Low-Rate Wireless Networks, IEEE Std 802.15.4-2015 (Revision of IEEE Std 802.15.4-2011). pp. 1-709, Apr. 22, 2016.
Jang et al., "A Four-Camera VGA-Resolution Capsule Endoscope System With 80-Mb/s Body Channel Communication Transceiver and Sub-Centimeter Range Capsule Localization", IEEE Journal of Solid-State Circuits. vol. 54, No. 2, pp. 538-549, (2019).
Jeong et al., "21.6 A 12nW always-on acoustic sensing and object recognition microsystem using frequency-domain feature extraction and SVM classification," IEEE International Solid-State Circuits Conference (ISSCC), San Francisco, CA, 2017, pp. 362-363, doi: 10.1109/ISSCC.2017.7870411.
Kadirvel et al., "A 330nA energy-harvesting charger with battery management for solar and thermoelectric energy harvesting," IEEE International Solid-State Circuits Conference, San Francisco, CA, 2012, pp. 106-108, doi: 10.1109/ISSCC.2012.6176896.
Kashyap et al., "On the Feasibility of Wireless Energy Transfer Using Massive Antenna Arrays," IEEE Transactions on Wireless Communications, vol. 15, No. 5, pp. 3466-3480, May 2016.
Katti et al., "BackFi: High Throughput WiFi Backscatter" SIGCOMM Comput. Commun. Rev. 45, 4 (Oct. 2015), 283-296. DOI:https://doi.org/10.1145/2829988.2787490.
Kitsunezuka et al., A 30-MHz-2.4-GHz CMOS Receiver With Integrated RF Filter and Dynamic Range-Scalable Energy Detector for Cognitive Radio Systems, IEEE Journal of Solid State Circuits, vol. 47, No. 5. pp. 1084-1093 (2012).
Krishnamurthy et al., "Properties of indoor received signal strength for WLAN location fingerprinting," The First Annual International Conference on Mobile and Ubiquitous Systems: Networking and Services, 2004. MOBIQUITOUS 2004., Boston, MA, USA, 2004, pp. 14-23, doi: 10.1109/MOBIQ.2004.1331706.
Krishnaswamy et al., "18.2 Highly-linear integrated magnetic-free circulator-receiver for full-duplex wireless," IEEE International Solid-State Circuits Conference (ISSCC), San Francisco, CA, 2017, pp. 316-317, doi: 10.1109/ISSCC.2017.7870388.
Kusy et al., "RF doppler shift-based mobile sensor tracking and navigation," ACM Trans. Sen. Netw. 7, 1, Article 1 (Aug. 2010), 32 pages. DOI:https://doi.org/10.1145/1806895.1806896.
Lu et al., "Wireless Networks With RF Energy Harvesting: A Contemporary Survey, IEEE Communications Surveys & Tutorials" vol. 17, No. 2, pp. 757-789 (2015).
Mercier et al., "A Low-Power Backscatter Modulation System Communicating Across Tens of Meters With Standards-Compliant Wi-Fi Transceivers," IEEE Journal of Solid-State Circuits, vol. 55, No. 11, pp. 2959-2969, Nov. 2020, doi: 10.1109/JSSC.2020.3023956.
Moez et al., "A 3.2 V -15 dBm Adaptive Threshold-Voltage Compensated RF Energy Harvester in 130 nm CMOS," IEEE Transactions on Circuits and Systems I: Regular Papers, vol. 62, No. 4, pp. 948-956, Apr. 2015, doi: 10.1109/TCSI.2015.2413153.
Mohammed et al., "Low-Complexity CFO Estimation for Multi-User Massive MIMO Systems," 2015 IEEE Global Communications Conference (GLOBECOM), pp. 1-7 (2015).
Morello et al., "CD3-OFDM: a novel demodulation scheme for fixed and mobile receivers," IEEE Transactions on Communications, vol. 44, No. 9, pp. 1144-1151, Sep. 1996, doi: 10.1109/26.536920.
Mudumbai et al., Demonstrating distributed transmit beamforming with software-defined radios, IEEE International Symposium on a World of Wireless, Mobile and Multimedia Networks (WoWMoM), San Francisco, CA, 2012, pp. 1-3.
Mudumbai et al., "Distributed beamforming using 1 bit feedback: from concept to realization" Proceedings of Citeseer Allerton. (2006).
Natarajan et al., "A 0.55-to-0.9GHz 2.7dB NF full-duplex hybrid-coupler circulator with 56MHz 40dB TX SI suppression," IEEE International Solid—State Circuits Conference—(ISSCC), San Francisco, CA, 2018, pp. 400-402, doi: 10.1109/ISSCC.2018.8310353.
Noubir et al., "iPoint: A Platform-Independent Passive Information Kiosk for Cell Phones," 2010 7th Annual IEEE Communications

(56)                    References Cited

OTHER PUBLICATIONS

Society Conference on Sensor, Mesh and Ad Hoc Communications and Networks (SECON), Boston, MA, 2010, pp. 1-9, doi: 10.1109/SECON.2010.5508246.

Reindl et al., "Harvesting Low Ambient RF-Sources for Autonomous Measurement Systems," 2008 IEEE Instrumentation and Measurement Technology Conference.

Reynolds et al., "Quadrature Amplitude Modulated Backscatter in Passive and Semipassive UHF RFID Systems," IEEE Transactions on Microwave Theory and Techniques, vol. 60, No. 4, pp. 1175-1182, Apr. 2012, doi: 10.1109/TMTT.2012.2185810.

Roberts et al., "26.8 A 236nW-56.5dBm-sensitivity bluetooth low-energy wakeup receiver with energy harvesting in 65nm CMOS," IEEE International Solid-State Circuits Conference (ISSCC), San Francisco, CA, 2016, pp. 450-451, doi: 10.1109/ISSCC.2016.7418101.

Roermund et al., "A 2.2/2.7fJ/conversion-step 10/12b 40kS/s SAR ADC with Data-Driven Noise Reduction," IEEE International Solid-State Circuits Conference Digest of Technical Papers, San Francisco, CA, 2013, pp. 270-271, doi: 10.1109/ISSCC.2013.6487730.

Roy et al., "A 6.45 µW Self-Powered SoC With Integrated Energy-Harvesting Power Management and ULP Asymmetric Radios for Portable Biomedical Systems," IEEE Transactions on Biomedical Circuits and Systems, vol. 9, No. 6, pp. 862-874, Dec. 2015, doi: 10.1109/TBCAS.2015.2498643.

Shirane et al., "RF-Powered Transceiver With an Energy- and Spectral-Efficient IF-Based Quadrature Backscattering Transmitter," IEEE Journal of Solid-State Circuits, vol. 50, No. 12, pp. 2975-2987, Dec. 2015, doi: 10.1109/JSSC.2015.2454235.

Shrivasta et al., "A 10 mV-Input Boost Converter With Inductor Peak Current Control and Zero Detection for Thermoelectric and Solar Energy Harvesting With 220 mV Cold-Start and -14.5 dBm, 915 MHz RF Kick-Start," IEEE Journal of Solid-State Circuits, vol. 50, No. 8, pp. 1820-1832.

Shrivasta et al., "A High Efficiency DC-DC Converter Architecture with Adjustable Switching Frequency to Suppress Noise Injection in RF Receiver Front-Ends," IEEE International Symposium on Circuits and Systems (ISCAS), Sevilla, 2020, pp. 1-5, doi: 10.1109/ISCAS45731.2020.9181202.

Shrivastava et al., "A 32nW bandgap reference voltage operational from 0.5V supply for ultra-low power systems," IEEE International Solid-State Circuits Conference—(ISSCC) Digest of Technical Papers, San Francisco, CA, 2015, pp. 1-3, doi: 10.1109/ISSCC.2015.7062942.

Shrivastava et al., "Infrastructure Circuits for Lifetime Improvement of Ultra-Low Power IoT Devices," IEEE Transactions on Circuits and Systems I: Regular Papers, vol. 64, No. 9, pp. 2598-2610, Sep. 2017, doi: 10.1109/TCSI.2017.2693181.

Shrivastava et al., "A 200nW, 25ppm/°C Relaxation Oscillator Architecture with Programmable Long-term and Short-term Stability using Single Gate Oxide Transistors," IEEE Journal of Solid-State Circuits, under review.

Shrivastava et al., "High Stability Gain Structure and Filter Realization with less than 50 ppm/°C Temperature Variation with Ultra-low Power Consumption using Switched-capacitor and Sub-threshold Biasing," IEEE International Symposium on Circuits and Systems (ISCAS), Florence, 2018, pp. 1-5, doi: 10.1109/ISCAS.2018.8351563.

Shrivastava et al., "RSSI Amplifier Design for a Feature Extraction Technique to Detect Seizures with Analog Computing," IEEE International Symposium on Circuits and Systems (ISCAS), Sevilla, 2020, pp. 1-5, doi: 10.1109/ISCAS45731.2020.9180802.

Siek et al., "A 400 nW Single-Inductor Dual-Input-Tri-Output DC-DC Buck-Boost Converter With Maximum Power Point Tracking for Indoor Photovoltaic Energy Harvesting," IEEE Journal of Solid-State Circuits, vol. 50, No. 11, pp. 2758-2772, Nov. 2015, doi: 10.1109/JSSC.2015.2476379.

Smith et al., "Ambient backscatter: wireless communication out of thin air" In Proceedings of the ACM SIGCOMM (SIGCOMM '13), Association for Computing Machinery, New York, NY, USA, 39-50. DOI:https://doi.org/10.1145/2486001.2486015 (2013).

Smith et al., "Passive wi-fi: Bringing low power to wi-fi transmissions," in 13th USENIX Symposium on Networked Systems Design and Implementation (NSDI16). Santa Clara, CA: USENIX Association, Mar. 2016, pp. 151-164.

Smith et al., Powering the next billion devices with wi-fi' Proceedings of the 11th ACI Confrence on Emerging networking Experiments and technologies (CoNEXT 15) (2015). Association for Computing Machinery, DOI:https://doiorg/i0. 1145/2716281. 2836089.

Sanchez-Sinencio et al.,, "A Fully Integrated Reconfigurable Self-Startup RF Energy-Harvesting System With Storage Capability," IEEE Journal of Solid-State Circuits, vol. 52, No. 3, pp. 704-719, Mar. 2017, doi: 10.1109/JSSC.2016.2633985.

Takamiya et al., "A Low-Power CMOS Crystal Oscillator Using a Stacked-Amplifier Architecture," IEEE Journal of Solid-State Circuits, vol. 52, No. 11, pp. 3006-3017 (2017).

Takiyama et al., "93% power reduction by automatic self power gating (ASPG) and multistage inverter for negative resistance (MINR) in 0.7V, 9.2µW, 39MHz crystal oscillator," Symposium on VLSI Circuits, Kyoto, 2013, pp. C142-C143.

Timotheou et al., "Beamforming for MISO Interference Channels with QoS and RE Energy Transfer" JEEE Transactions on Wireless Communications, vol. 13, No. 5, pp. 2646-2658 (2014).

Voigt et al., "LoRea: A Backscatter Architecture that Achieves a Long Communication Range," Proceedings of the 15th ACM Conference on Embedded Network Sensor Systems (SenSys '17). Association for Computing Machinery, New York, NY, USA, Article 18, 1-14. DOI:https://doi.org/10.1145/3131672.3131691 (2017).

Wang et al., "Feedback rate optimization in receiver-coordinated distributed transmit heamforming for wireless power transfer" Annual Conference on Information Sciences and Systems (CISS), Baltimore, MD, 2015.

Yedavalli et al., Far-Field RF Wireless Power Transfer with Blind Adaptive Beamforming for Internet of Things Devices, IEEEAccess, vol. 5, pp. 1743-1752 (2017).

Zeng et al., "Design of Sub-Gigahertz Reconfigurable RF Energy Harvester From -22 to 4 dBm With 99.8% Peak MPPT Power Efficiency," IEEE Journal of Solid-State Circuits, vol. 54, No. 9, pp. 2601-2613, Sep. 2019, doi: 10.1109/JSSC.2019.2919420.

Zeng et al., "Optimized Training Design for Wireless Energy Transfer" IEEE Transactions on Communications, vol. 63, No. 2, pp. 536-550, (2015).

Zhang et al., "Energy Beamforming With One-Bit Feedback", IEEE Transactions on Signal Processing, vol. 62, No. 20, pp. 537 (2014).

Zhang et al., "Wireless powered communication: opportunities and challenges," IEEE Communications Magazine, vol. 53, No. 4, pp. 117-125, Apr. 2015, doi: 10.1109/MCOM.2015.7081084.

Zhang et al., "MIMO Broadcasting for Simultaneous Wireless Information and Power Transfer," IEEE Transactions on Wireless Communications, vol. 12, No. 5, pp. 1989-2001, May 2013.

Zhou et al., "Maximum-likelihood carrier frequency offset estimation for OFDM systems in fading channels," IEEE Wireless Communications and Networking Conference, 2006. WCNC 2006., , pp. 1461-1464 (2006). doi: 10.1109/WCNC.2006.1696502.

(a) Beamforming with 21ppm frequency offset (b) Periodic phase correction using LF Oscillator.

Die Photo of a recent SBG EH

Table I. Anticipated efficiency gain and cost and size reduction

| Design Goal | State-of-the-art | Anticipated Results | Impact |
|---|---|---|---|
| WPT Range | <20m [11],[12],[13] | 10-100m | Efficiency ↑ |
| RF-to-DC, DC-DC Conversion (MPT) | ~50% @0dBm (Discrete) [5], [46], [49] | 40-70% (-30 to 10dBm) (Integrated) | Efficiency ↑ Size, Cost ↓ |
| Beamforming Convergence | 159s for 12 Tx [11] 300ms for 3Tx[13] | 6ms per Tx pair | Efficiency ↑ |
| Feedback Method | Conventional Rx, Tx | Backscatter Comm. | Cost ↓ |
| Comm. Power | 10-100s mW [11],[13] | 50 nW | Efficiency ↑ |
| LO / CFO Synchronization | OCXO based GPSDO[11], OCXO[15] | Frequency offset correction in LO | Cost, Size ↓ Cost/Watt ↓ |
| Interference Soln. | Separate TX and RX Channel & Antenna [11] [15] | Same Channel | Cost ↓ |
| Mobile WPT Speed | 0.5m/s (constant) [11] | >10m/s | Efficiency ↑ |

FIG. 11

ULTRA-LOW POWER BEAMFORMING WIRELESS POWER TRANSFER SYSTEM

CROSS REFERENCE TO RELATED APPLICATIONS

This application is a divisional of U.S. Non-Provisional patent application Ser. No. 17/861,603 filed on Jul. 11, 2022, which claims priority from U.S. Provisional Patent Application No. 63/221,694 filed on Jul. 14, 2021, each of which is hereby incorporated by reference herein in its entirety.

BACKGROUND

Various embodiments disclosed herein relate to a high-efficiency, wireless power transfer (WPT) scheme through which a network of RF energy transmitters can be combined to concentrate power at a remotely located energy receiver. The system maximizes the received RF energy in a three-pronged way. An ultra-low power (ULP) closed loop, beamforming, energy transfer scheme is used to maximize the received RF energy, a high efficiency RF rectifier circuit is used to enhance RF-to-DC conversion efficiency, and a high efficiency power management unit is used to operate the rectifier at its maximum power point. These innovations realize a several fold increase in WPT to enable mobile, remote, and natural disaster applications that would otherwise require large batteries. It also enables on-demand access of remote devices.

State-of-the-art beamforming WPT systems generally either operate in an open loop way or use channel sensing methods for closed loop optimization. They have lower end-to-end efficiency, have large size and weight, and incur high cost. Furthermore, the handling of the received power requires an additional RF-to-DC conversion step, where state-of-the-art solutions have shown lower efficiency. Circuit innovations disclosed herein overcome these limitations. A ULP received power sensing technique using on-chip passive rectifiers, low-power sensing circuits, and a backscattering communication method is used to lower the power, cost, and size associated with closed loop beamforming. An integrated self-biased gate rectifier and maximum power tracking circuit is also used to realize high efficiency RF-to-DC conversion.

Distributed RF Beamforming is a promising technique to transfer energy to a remotely located receiver [1]-[8]; however, its efficacy depends on how well the transmission phases are aligned at the receiver. One common technique is to use channel state information (CSI) estimation where specific patterns are transmitted to obtain channel information for beam optimization [7]-[10]. Another approach is to measure the received power using a received signal strength indicator (RSSI) circuit [11]-[14]. However, both RSSI and CSI based techniques have high power consumption (10 s of mW) [17]-[19] and require baseband signal processing capability often not feasible in low power, low-cost, sensing devices. In mobile, remote and natural disaster needs, the location of energy receiver may not be precisely known and channel information can vary continuously, requiring frequent updates of CSI or RSSI values. Furthermore, a small frequency offset among transmitters (<±40 ppm), arising from their crystal oscillator (XO) source for local oscillator (LO), causes phase misalignment. It leads to lower efficiency and requires frequency synchronization for mitigation. Recent works use a GPS disciplined oscillator (GPSDO) with oven-compensated XO (OCXO) [11][15] for synchronization but consume power in Watts [22][23].

Optimal beamforming WPT requires feedback of receiver's power to continually adjust for phase and frequency offset. However, the circuit at the receiver that can provide this feedback needs to operate at the ULP level for higher/usable energy transfer efficiency. In accordance with various embodiments, disclosed herein is a closed-loop RF beamforming WPT scheme using ULP received power sensing and backscattering communication to enable feedback-based optimization. These techniques can enable closed-loop beamforming with less 50 nW power overhead, a 5-orders of magnitude power reduction with lower cost and size. The received power obtained from beamforming requires further optimization for RF-to-DC conversion in the power train. Building on our prior work on self-biased gate rectifiers, a new topology is provided to achieve high RF-to-DC conversion efficiency of over 40-70%. An integrated ULP maximum power point tracking circuit operates the rectifier at its maximum power point. Table I (FIG. 11) summarizes the improvements in several critical application parameters for WPT.

BRIEF SUMMARY OF THE DISCLOSURE

A wireless power transfer (WPT) system in accordance with one or more embodiments is provided for combining and transferring the radio frequency (RF) energy output of a network of RF energy transmitters to a remotely located energy receiver. The system includes an ultra-low power (ULP) closed loop, beamforming, energy transfer system configured to sense received power from each of the RF energy transmitters and to correct the phase and frequency offset among the RF energy transmitters based on the sensed received power.

A wireless power transfer (WPT) system in accordance with one or more further embodiments is provided for combining and transferring the radio frequency (RF) energy output of a network of RF energy transmitters to a remotely located energy receiver. The system comprises an energy transfer system configured to sense received power from each of the RF energy transmitters and to correct the phase and frequency offset among the RF energy transmitters based on the sensed received power. The energy transfer system includes a pulse generator to generate backscattering pulses to transmit received power information to the RF energy transmitters to align transmitter phases.

A wireless power transfer (WPT) method in accordance with one or more embodiments is provided for combining and transferring the radio frequency (RF) energy output of a network of RF energy transmitters to a remotely located energy receiver. The method includes sensing received power from each of the RF energy transmitters and correcting the phase and frequency offset among the RF energy transmitters based on the sensed received power.

A wireless power transfer (WPT) system in accordance with one or more further embodiments is disclosed for combining and transferring the radio frequency (RF) energy output of a network of RF energy transmitters to a remotely located energy receiver. The system includes an ultra-low power (ULP) closed loop, beamforming, energy transfer system configured to sense received power from each of the RF energy transmitters and to correct the phase and frequency offset among the RF energy transmitters based on the sensed received power. The energy transfer system further includes a pulse generator to generate backscattering pulses to transmit received power information to the RF energy transmitters to align transmitter phases. The WPT system also includes an RF-to-direct current (DC) converter for converting the RF energy output from the RF energy transmitters to direct current. The RF-to-DC converter includes an integrated self-biased gate (SBG) rectifier and a power tracking circuit to operate the self-biased gate rectifier at a maximum power point.

A wireless power transfer (WPT) method in accordance with one or more further embodiments is provided for combining and transferring the radio frequency (RF) energy output of a network of RF energy transmitters to a remotely located energy receiver. The method includes the steps of: (a) sensing received power from each of the RF energy transmitters and correcting the phase and frequency offset among the RF energy transmitters based on the sensed received power, including generating backscattering pulses to transmit received power information to the RF energy transmitters to align transmitter phases; and (b) converting the RF energy output from the RF energy transmitters to direct current (DC) using a self-biased gate (SBG) rectifier and a power tracking circuit to operate the self-biased gate rectifier at a maximum power point.

BRIEF DESCRIPTION OF THE DRAWINGS

FIG. 11 shows Table I.

DETAILED DESCRIPTION

Figure 1:
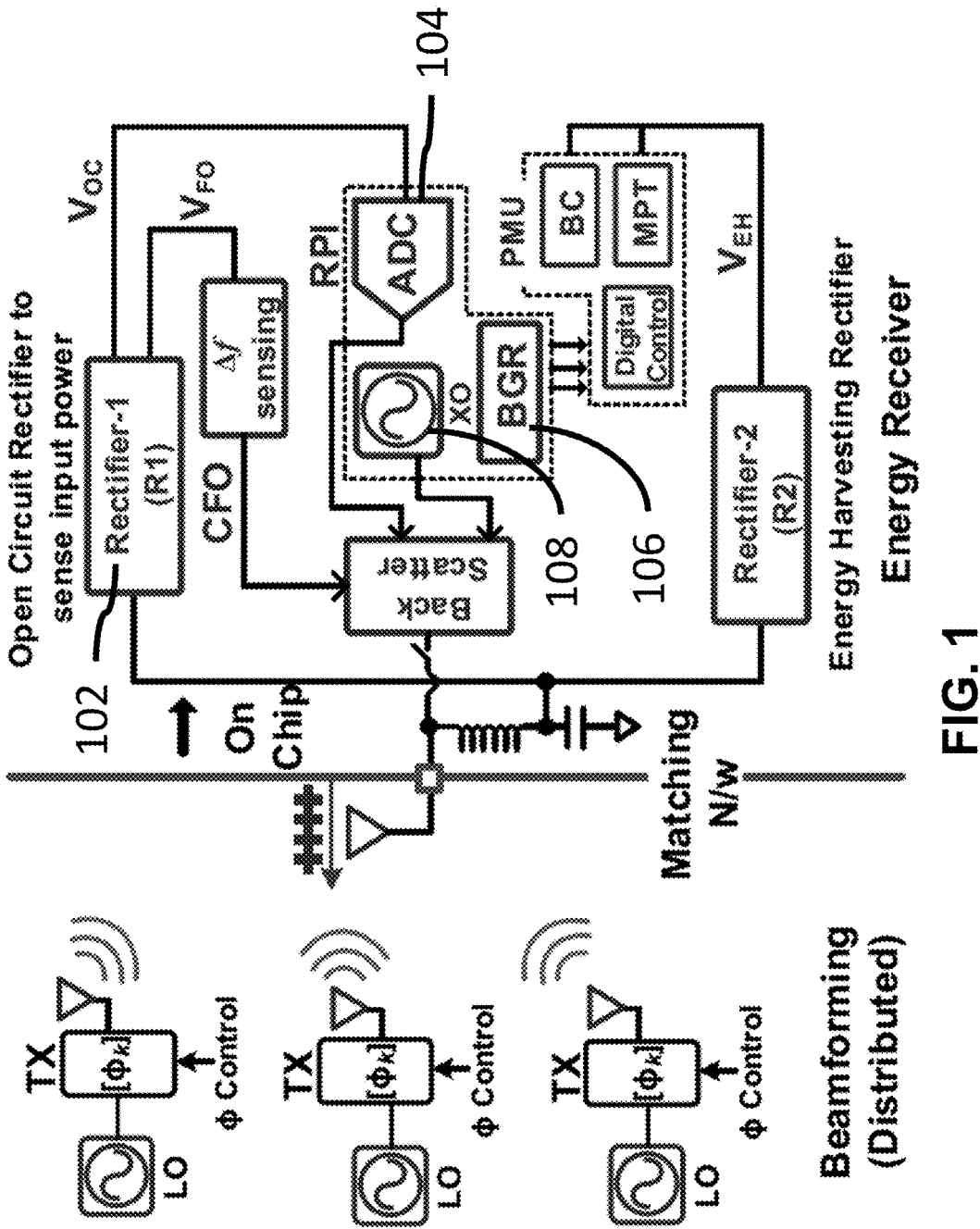
FIG. 1 illustrates an exemplary closed-loop WPT scheme in accordance with one or more embodiments.

FIG. 1 shows a closed-loop WPT scheme in accordance with one or more embodiments, which comprises three integrated components used for realizing high end-to-end efficiency. A ULP (<50 nW) sensing technique is used to sense the received power level, a new high-efficiency (40-70%) rectifier topology is used to maximize efficiency for RF to DC conversion with a maximum power tracking technique, and a ULP (<5 nW) backscattering communication method is used for closed-loop feedback for optimal beamforming. The ULP sensing of incoming power is performed using an open-circuit rectifier 102 in combination with an analog to digital converter (ADC) 104, band gap reference (BGR) 106, and an XO 108 with all operating at ULP level. A backscattering technique using pulse interval modulation is used to send short pulses to transmit the received power information for aligning transmitter phases.

Beamforming Transmitter Architecture

Error! Reference source not found. shows an exemplary circuit architecture in accordance with one or more embodiments to correct phase (ø) and frequency offset among energy transmitters used for optimal beamforming to maximize energy transfer.

Figure 2:
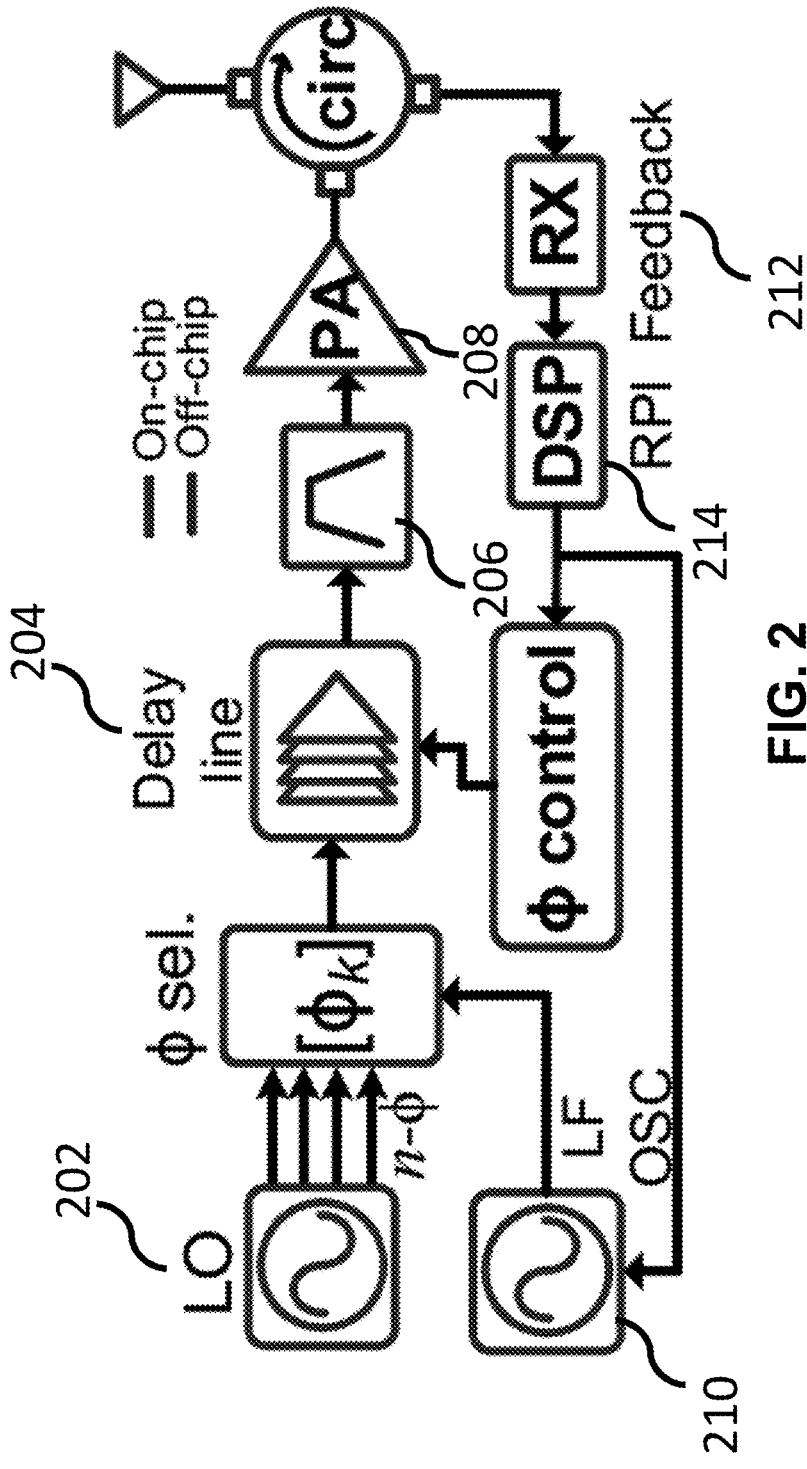
FIG. 2 illustrates exemplary phase and frequency offset control in accordance with one or more embodiments.

Phase Correction: The magnitude of the beamformed power from two different transmitters is given by A2+B2+ 2AB cos Ø (eq. 1), with A and B being their amplitudes. For maximizing received power in varying channel conditions, Ø needs to be continuously corrected. Disclosed herein is a delay-line based phase correction technique. After obtaining feedback on received power from the energy receiver, a corresponding delay to adjust LO 202 phase is introduced using the delay-line 204 (FIG. 2). Fine delay elements (<10 ps for 2.4 GHz) can be used to correct different phase offsets between transmitters. An off chip bandpass filter 206 cleans the signal before it is fed to the power amplifier (PA) 208.

Frequency Offset Correction: Small frequency offset exists among transmitters due to LO offsets, even at same channel, with tolerances of <±40 ppm specified in IEEE standards [20], [21]. With a frequency offset of $\Delta f$, the received power becomes $A^2+B^2+2AB \cos(2 \pi \Delta ft+\emptyset)$ resulting in a reduced input power and loss of phase alignment (Error! Reference source not found. A). To continue to harvest maximum power, the $2 \pi \Delta ft+\emptyset=0$ condition needs to be met; i.e., requiring phase to continuously adjust to track $\Delta f$. Current strategies to correct frequency offset [26]-[28], including the use of OCXO based GPSDO for transmitters [11], have high power overhead.

Figures 3A, 3B:
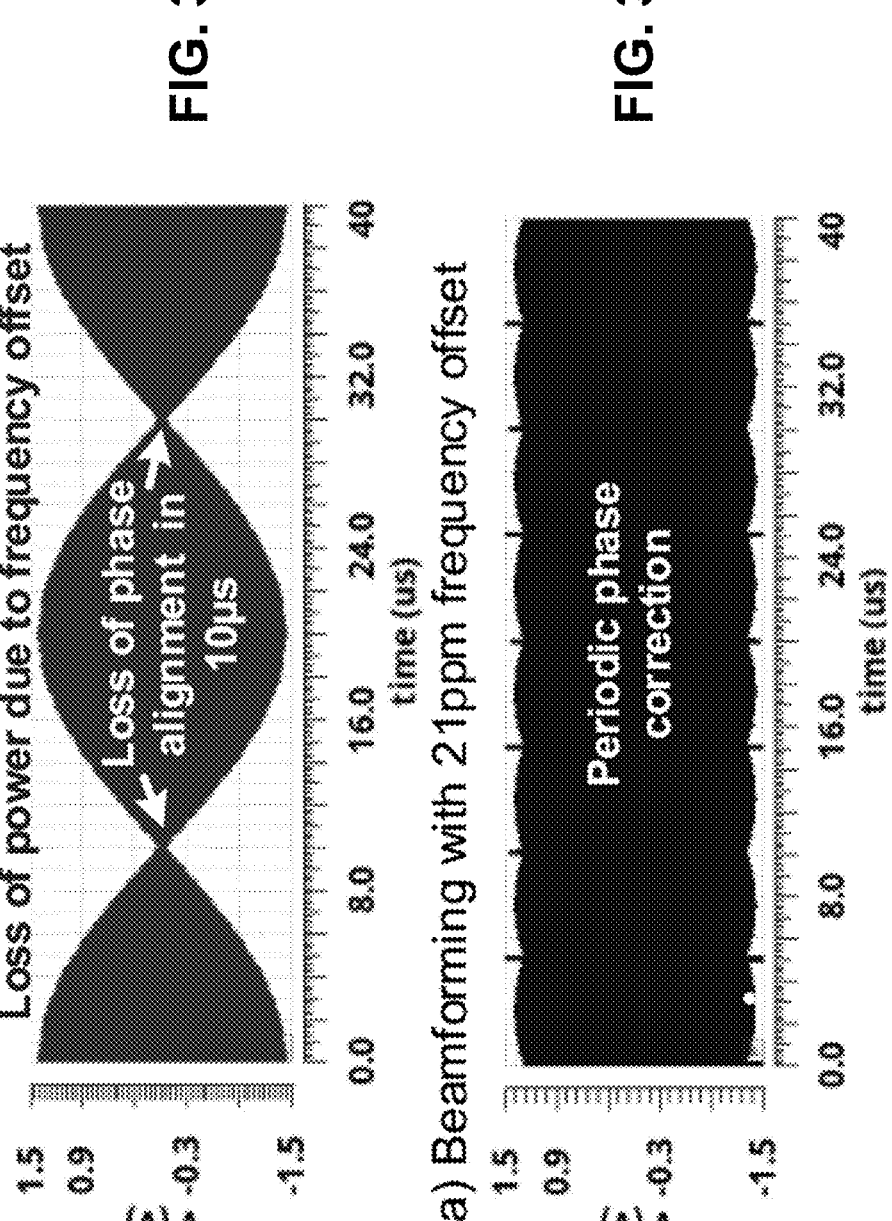
FIGS. 3A and 3B (collectively FIG. 3) are graphs based on a simulation showing effect of frequency offset and its mitigation.
Figure 4:
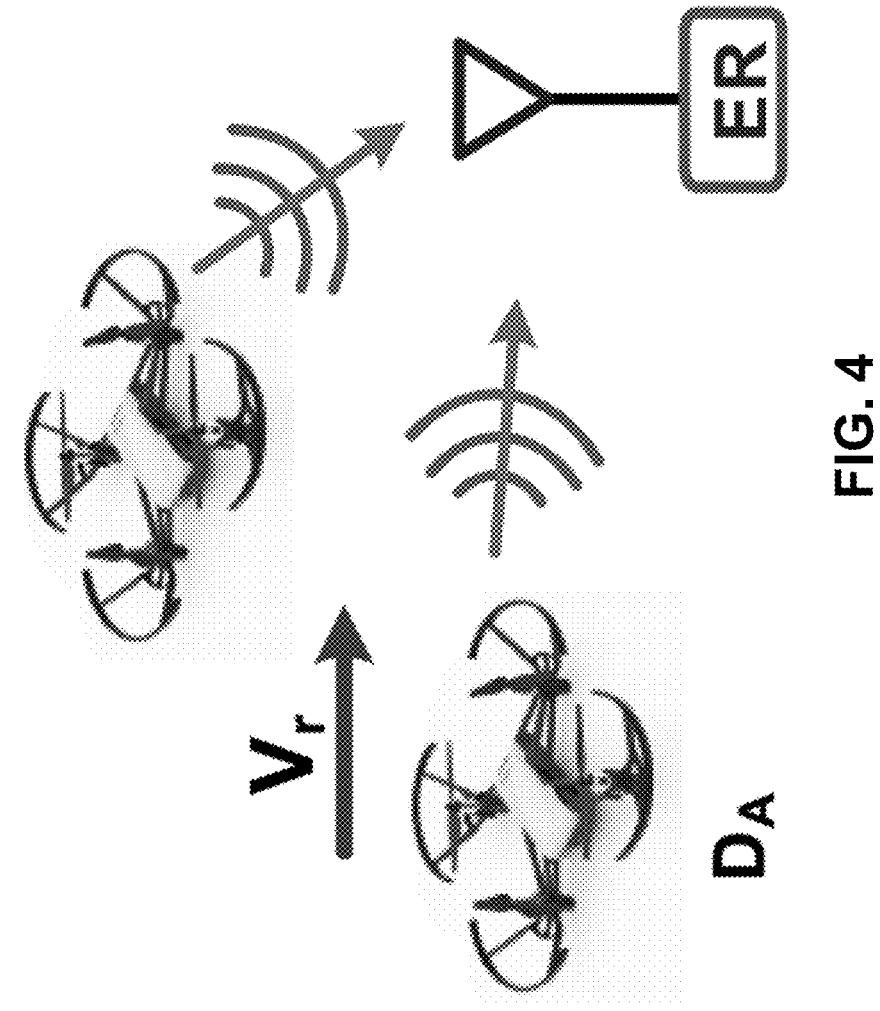
FIG. 4 illustrates fly-by WPT using multiple drones in accordance with one or more embodiments.

In accordance with one or more embodiments, the frequency offset is removed by periodically changing the phase of one transmitter relative to the other using a low-frequency (LF) oscillator 210 (FIG. 2). The feedback 212 from the energy receiver will provide the value of $\Delta f$, which is used to set the frequency of the LF oscillator 210. Using the digital signal processor (DSP) 214, the correct phase and frequency offset needed for realizing optimized beamforming is obtained. FIG. 3B shows the beamformed received power from two transmitters with a 21 ppm frequency offset using a design exploration of an LF oscillator 210 and the delay-line 204. The LF oscillator 210, operating at 200 KHz, periodically selects 4-different phases of 2.4 GHz LO 202 followed by additional phase correction using the delay-line 204. With a 4-point phase correction, the received power is increased by ~2X (FIG. 3B). With more phase points, a flatter beamformed response can he realized. Disclosed herein is an 8-point phase correction to cover a range of 0.1-50 ppm frequency offset using digitally programmable LF oscillator.

Doppler Shift: In mobile applications, a relative motion $(V_r)$ between transmitters and/or receiver would also result in a frequency offset due to Doppler shift. Doppler shift can be corrected using channel estimation [31][32] or its effects can be reduced using inertial measurement units (IMUs) [33][34] but these methods have higher overhead for WPT. In one or more embodiments, frequency offset correction can be leveraged to correct Doppler shift as well. An envisioned fly-by WPT using multiple drones is visualized in Error! Reference source not found. Each drone arriving close to an energy receiver would start charging while remaining in motion. The proposed frequency offset correction method has a faster response time. It will correct frequency and phase offset quickly to realize a faster beam convergence (6 ms for two transmitters). Several mobile charging units can fly-by a remote sensor to realize mobile beamforming wireless charging.

Power Sensing Technique

The energy receiver detects the phase and frequency offset in beamforming by observing the pattern of received power. Error! Reference source not found. shows an architecture for power sensing in accordance with one or more embodiments.

Figure 5:
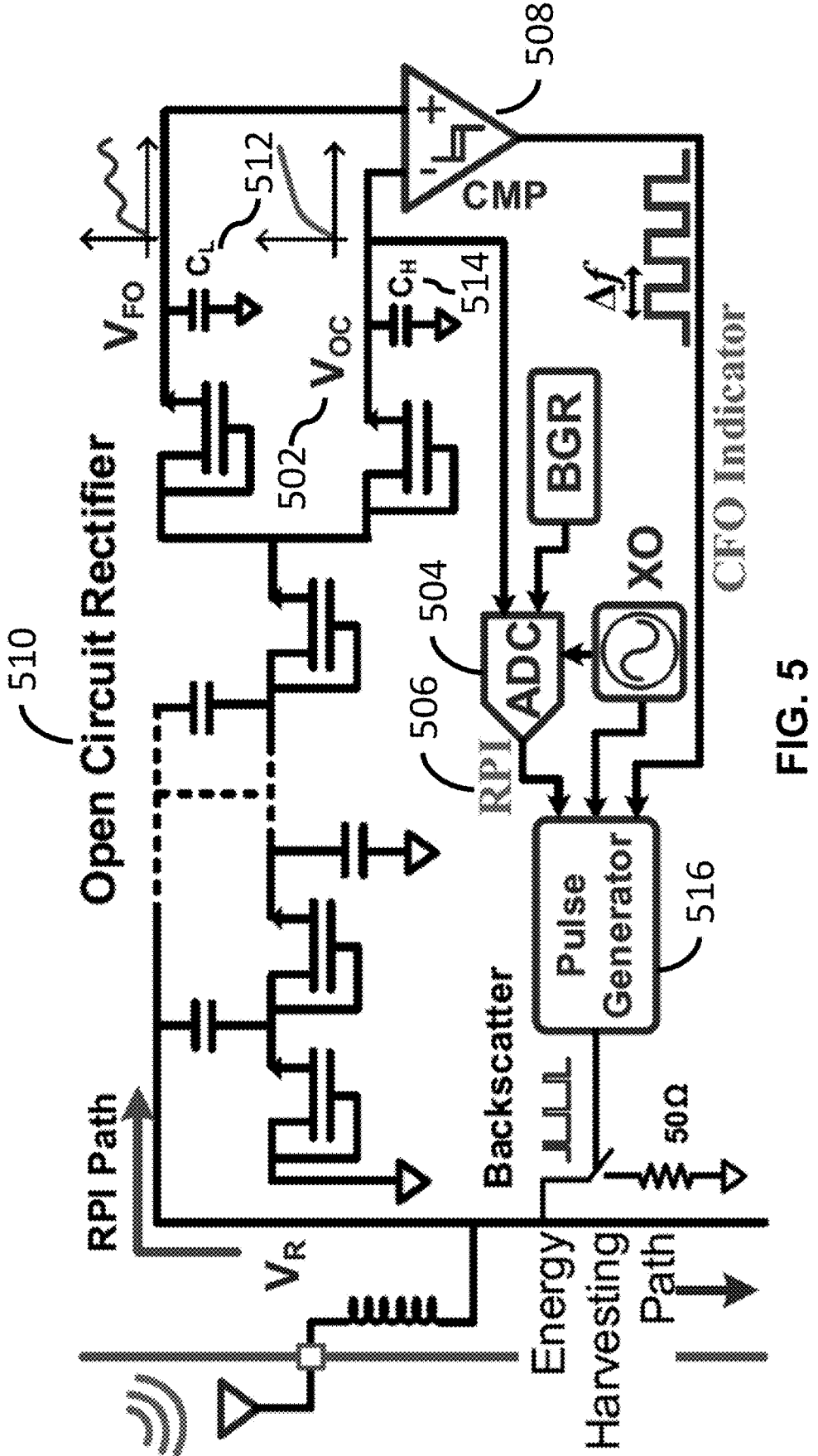
FIG. 5 shows an exemplary circuit architecture for sensing received power in accordance with one or more embodiments.

Received Power Sensing: A rectifier's open circuit voltage (VOC) 502 is used to sense the received power. Our recent analysis shows that VOC is linear with the amplitude (VR) of the received power, given by $V=n(VR-\eta SVt/(1+\eta S))$, with n, $\eta S$, and Vt being constants. It shows that Voc is independent of transistor size or type, enabling a minimum sized design for sensing. We were able to verify this on a recent chip. The output of VOC will be periodically sampled, converted to digital using ADC 504 to generate the received power indicator (RPI) 506 (FIG. 5). As RPI sensing is done independent from energy harvester, VOC capacitor is small (in pFs compared to µFs [12]) and its settles fast (<1 ms) to provide a fast feedback on received power.

Figures 6A, 6B:
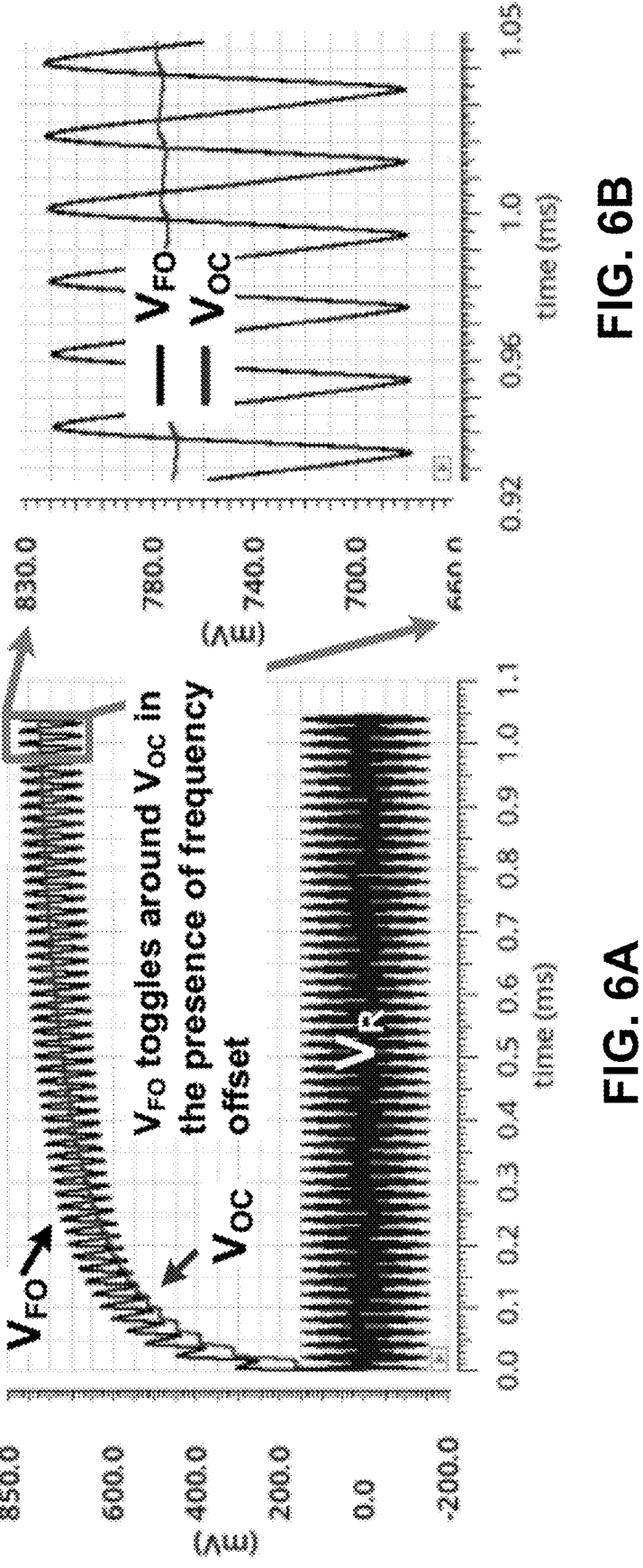
FIGS. 6A and 6B (collectively FIG. 6) are graphs based on a simulation of VOC and VFO while receiving –20 dBm power with frequency offset at 2.4 GHz and 2.40005 GHz.

Frequency Offset Sensing: The open circuit rectifier 510 in FIG. 5 has two outputs, one connected to a low capacitor (CL<0.2 pF) 512 producing VFO, while other connected to a larger capacitor (CH<25 pF) 514 producing VOC. Both outputs will settle to the same DC voltage in absence of frequency offset. With frequency offset (FIG. 3A), VFO will show an oscillation due to lower CL value. VOC, on the other hand, will show a much smaller ripple due to higher value of CH. FIG. 6 shows the simulation of an early concept design. VOC and Vo are fed to a ULP comparator 508. Since, VFO will have higher swing over VOC, the comparator 508 will generate a toggling output at Δf frequency, generating a career frequency offset (CFO) indicator. The output is fed to a pulse generator 516 to transmit it using backscattering.

To realize high efficiency WPT, the energy receiver's power overhead should be minimal. Minimal power overhead is realized by ULP and high efficiency circuits [35]-[40]. The ULP circuit includes designs of an open circuit rectifier, ULP comparator, ADC, and different biasing circuits. A passive rectifier with no static power overhead provides $V_{OC}$ and $V_{FO}$ for sensing. Minimum sized open circuit rectifier designs can perform sensing using <1%-0.1% of incoming power. A ULP (<5 nW) [35]-[37] comparator is advanced to sense frequency offsets of <50 ppm at 2.4 GHz.

Other circuit components include a BGR, ADC, and an XO. We have previously reported a 1.5 nW XO which can be reused as a clock source. We have also reported one of the lowest power BGR circuit [39], which is advanced to develop a <20 nW reference to be used by the ADC and energy harvester. Smaller capacitors and lower supply levels can be used to realize >8-bit SAR ADCs with less than 10 nW power with 1 KS/s sampling rate [41]-[43]. Using our robust sub-threshold design method [44][45], we advance a 20 nW, 8-bit ADC design at 1 KS/s sampling.

Our sensing technique provides sufficiently higher update rate of 1 ms for phase offset correction with less than 50 nW power. Prior works have proposed update rate of 50 ms and support mobile applications at 0.5 m/s. In applications where channel is fairly stable, the update rate can be further lowered, and several circuits (except clock) can be duty-cycled to reduce the power consumption down to 5 nW.

Backscattering Communication

Communication power overhead can be significantly reduced using backscattering [57]-[62]. However, due to path-loss, fading, and self-jamming from the base transmitter, its range remains rather limited. Recent works address self-jamming using intermediate frequency to move the backscattered signal to an alternate channel but they consume high power (10-100 µW [59][62]).

For WPT, the application needs are significantly different from data transfer in several ways: (i) the transmitter needs to send power for a long duration for the receiver to harvest enough energy, (ii) the modulation of the antenna adversely affects energy harvesting as it reflects the incoming power, (iii) by realizing optimized beamforming, a higher incident power can be reflected which can inherently increase the range. Disclosed herein is an optimized backscattering technique to address WPT need using a pulse interval modulation (PIM) scheme consuming less than 5 nW power.

Error! Reference source not found. shows the architecture of the backscattering technique in accordance with one or more embodiments. To ensure that most of the incoming energy goes towards harvesting, short and fixed-time pulses for scattering are used from a pulse generator.

Figure 7:
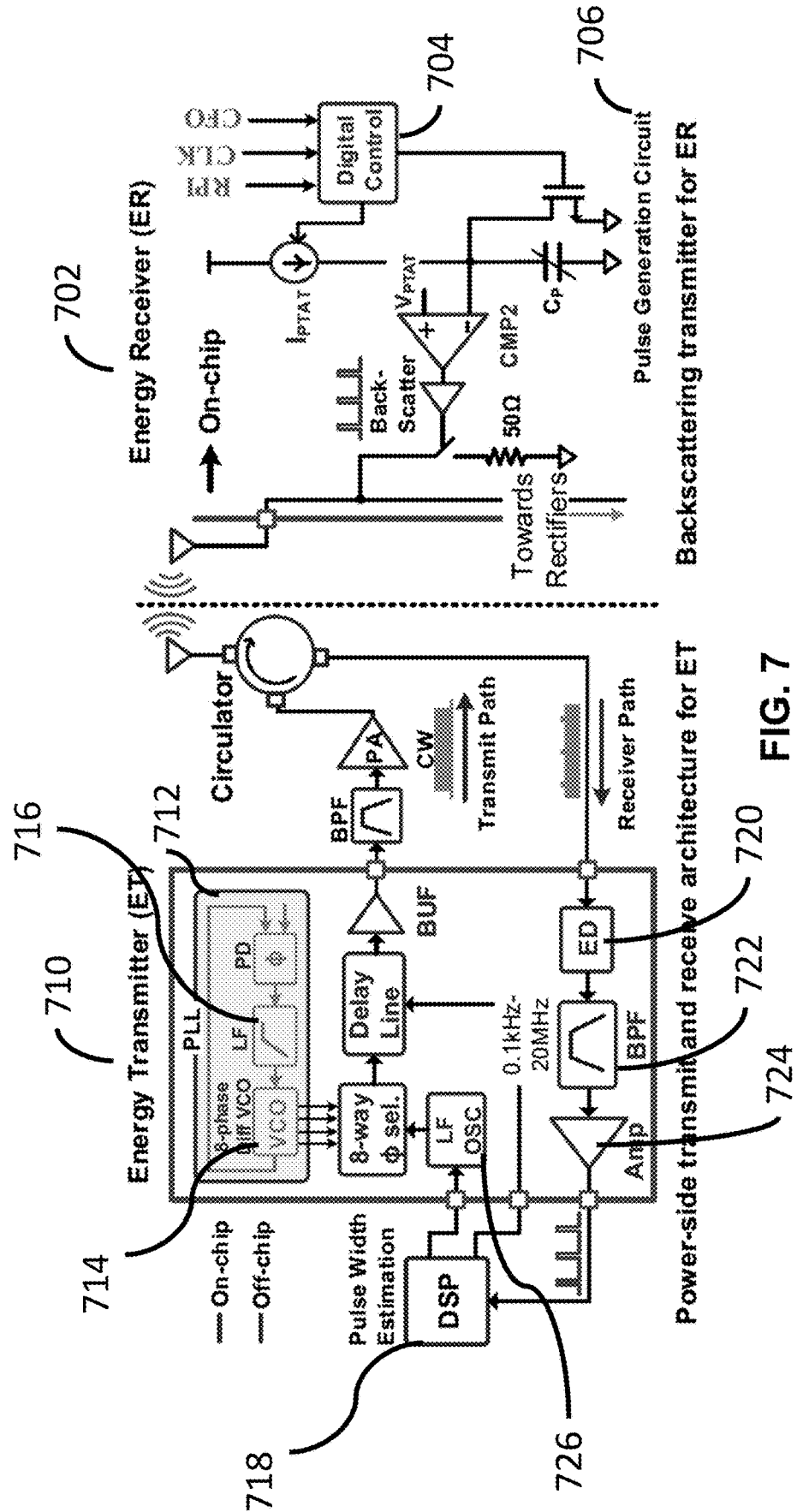
FIG. 7 is an exemplary circuit architecture of full-duplex backscattering communication to enable feedback-based phase and frequency correction in accordance with one or more embodiments.
Figure 8:
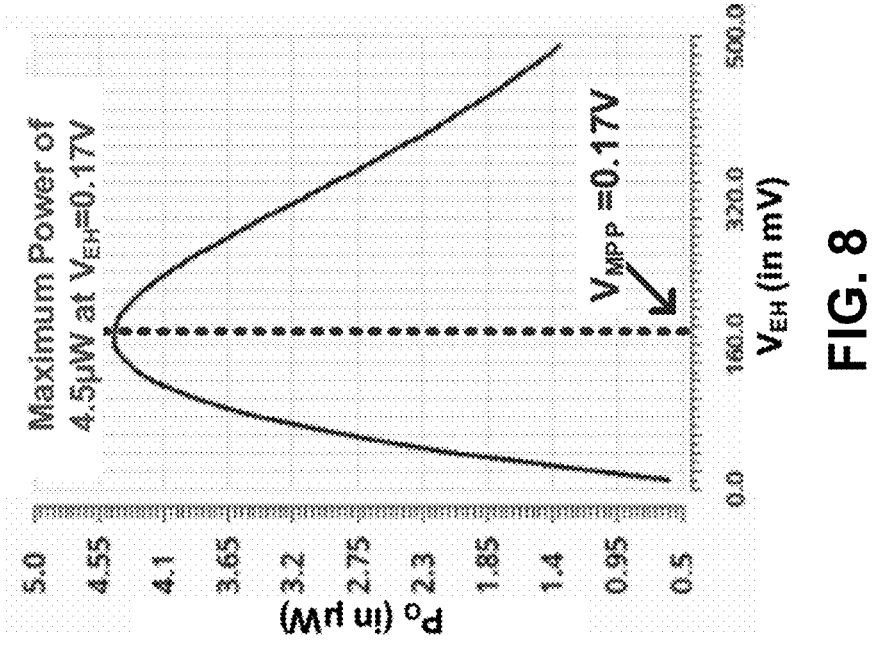
FIG. 8 is a graphs showing maximum power point in rectifiers.

Pulse Generator—FIG. 7 shows the circuit architecture of the pulse generator. It takes RPI, CFO, and CLK as inputs to generate backscattering pulses. The pulse duration is tightly controlled using precision timing circuits, a technique used by us to generate high precision on-chip timers [63][64]. The digital controller 704 selects the rate of CFO and RPI transmission. For CFO, short pulses at Δf frequency are sent. The energy transmitter 710 upon receiving these short pulses at fixed interval can deduce the frequency offset. Note that several pulses can be sent to account for noise and other non-idealities to recover the averaged frequency offset. For RPI transmission, we will transmit short pulses at 32 Kbps. The PIM will encode "1" with a pulse width of TP and "0" with 2 TP. Optimal TP, with initial estimate of <100 ns can be used as a potential choice. At 100 ns, the antenna is modulated only for 0.3% of the time directing most of the power to the harvester. Short pulse and lower bitrate (32 Kbps) reduces the leakage of power outside of the channel to reduce interference. Low bit-rates also increase the communication range [68] [71].

Backscattering Receiver (ET Side)—Circulators are used on the transmitter side to reduce self-jamming. Recent high isolation CMOS circulators [65],[66] can be used for a lower cost solution. However, to reduce the risk and focus on key research ideas, we use commercial magnetic circulators with >40 dB isolation (Error! Reference source not found.). The received signal is fed to an envelope detector (ED) to detect short pulses. ED's output is filtered, amplified and sent to DSP for processing. The DSP can also implement equalization techniques to reduce multi-path effects. Short pulse transmission at a low frequency can help in an easier mitigation of multi-path.

On the energy receiver (ER) 702 side, pulse generation circuit 706 and ULP digital control 704 for configuring CFO and RPI transmission is advanced. Also, the duration of pulse is significantly smaller than the bit-period. The pulse generator 706 is duty-cycled to save more power. The power consumption of backscatter transmission is anticipated at less than 5 nW. On the energy transmitter side, a new topology of a PLL 712 is advanced using differential ring voltage controlled oscillator (VCO) 714 to generate 8 different phases of LO. The LF oscillator 716 is set using the digital word from the DSP 718 to continuously adjust transmission phases for frequency offset correction. A transmitter chip-prototype with ED 720, filter 722, amplifier 724, PLL 712, and LF oscillator 726 can he used. The backscattering transmitter will be part of the energy receiver chip. We will use an FPGA for DSP implementation and use commercial filter and power amplifier (PA) for CW energy transmission.

Energy Harvesting RF-to-DC Rectifier

The next step in energy transfer requires high efficiency RF-to-DC conversion. Off-chip discrete diode-based [46]-[48] and on-chip CMOS based RF-to-DC rectifiers have been extensively reported [49]-[53]. High efficiency RF-to-DC conversion design requires: (i) realizing higher conduction, lower loss diodes, (ii) maintaining high efficiency across input power, and (iii) impedance matching for maximum power tracking.

RF-to-DC rectifiers show a unique operating point at which received power is maximum. Error! Reference source not found. shows this maximum power point (MPP) as a function of rectifier's output voltage (VEH). We need to operate the rectifier at its MPP for high efficiency. Our analysis also shows that the maximum power and its MPP changes with the number of stages used in a rectifier. Most efficient RF-to-DC conversion requires that we not only operate the rectifier at its MPP but also choose the correct number of stages. As input power can continuously vary in a dynamic environment, maximum power extraction requires continuous update of optimal number of stages and operating voltage. A new ULP maximum power tracking scheme is provided that maintains high efficiency across input power (−40 to +10 dBm). A new self-biased gate (SBG) rectifier is also provided to improve diode's conductivity to further improve the efficiency.

Figures 9A, 9B:
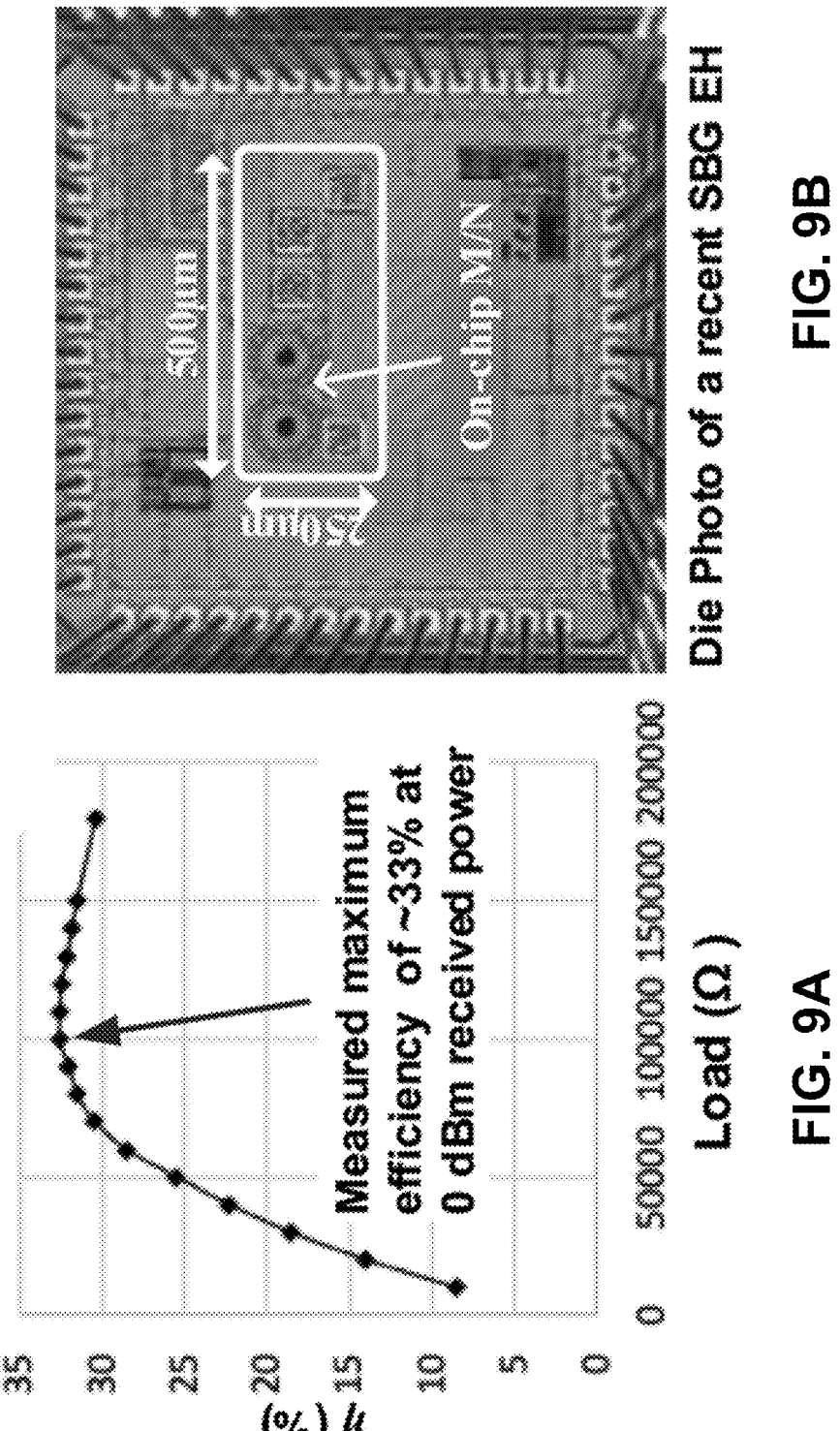
FIGS. 9A and 9B (collectively FIG. 9) show measurement of an SBG rectifier with on-chip matching network (65 nm, @1 GHz) and a die photo of an SBG energy harvester (EH).
Figures 10A, 10B:
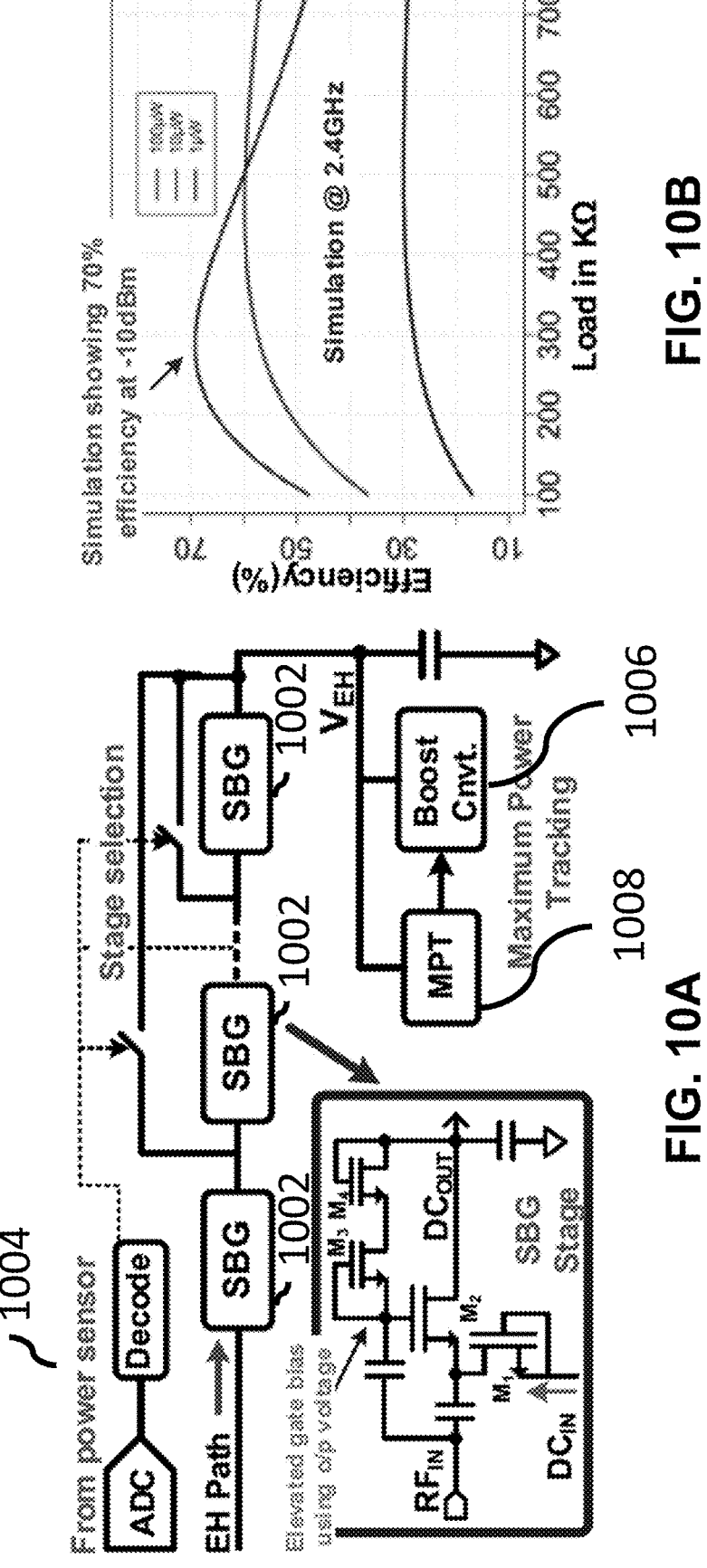
FIGS. 10A and 10B (collectively FIG. 10) show an exemplary SBG rectifier architecture in accordance with one or more embodiments and a graph showing its preliminary results.

FIG. 10 shows the topology of the high efficiency, wide-input range. RF-to-DC converter architecture using SBG rectifier stages 1002 in accordance with one or more embodiments. SBG is a new rectifier topology developed by us where an elevated gate-bias is achieved from the input power. The high gate-bias improves diode's conductance resulting into a higher efficiency (>23%) over a conventional Dickson stage. A preliminary design was verified using a recent 65 nm CMOS chip with on-chip matching network showing an end-to-end peak efficiency of 33% at 0 dBm (FIG. 9). Simulations show that we can achieve >70% (FIG. 10) efficiency with better matching, optimization, and dynamic body biasing for SBG. To support large input power range while maintaining high efficiency, optimal stage selection is also needed. The power sensing circuit is repurposed to use its level to select optimal stage size (FIG. 10). Using the ULP operation, a new SBG topology, and a reconfigurable stage selection, a 40-70% RF-to-DC conversion efficiency for an input power of 30 dBm to +10 dBm can be achieved. High efficiency at −40 dBm can also be achieved to be able to perpetually operate nW-power level sensors 1004.

We use our ULP boost converter 1006, which is among the most efficient DC-DC converters as a load for maximum power tracking (MPT) 1008. A closed-loop control using hill climbing based MPT scheme will be advanced, where tracking is achieved by controlling the switching frequency of the boost converter. At higher power, it will scale up the converter's switching frequency to harvest more energy and reduce it when the input power is lower. The MPT scheme consumes <5 nW power to maintain high tracking efficiency even at input power 40 dBm.

Energy Network Organization and Design—With design optimizations, the WPT solution will perform well at different frequencies. The solution can be optimized to be compatible with IEEE 802.11.g in the 2.4 GHz operation. Participating transmitters can select a non-overlapping channel for WPT. All transmitters can synchronize relative to a designated base node in a pairwise and sequential manner. An optimal number of transmitters (>20) possible for beamforming can be determined. Assuming excellent received signal at −50 to −30 dBm from each transmitter, beamforming with several transmitters can raise the input power to −30 to −20 dBm, which when reflected using backscattering can have 10-100 m line-of-sight range [59][71].

Communication Protocol—Update rates for phase and frequency offset can be determined. Frequency offset can be corrected by sending Δf for initial 10 ms. Once updated, its rate can be less frequent as XOs remain fairly stable over time [29][30]. After this, phase information can be transmitted every 1 ms. The transmitted packet will be sent at 32 Kbps containing a preamble and 8-bit ADC level. Upon receiving the ADC level, energy transmitter will compare it with its previous value and change its phase to perform a 6-bit binary search for optimal phase using the delay line. Phase alignment between two transmitters can be achieved within 6 ms using this technique. Note that 8-bit ADC and 6-bit phase resolution is sufficient for >99% beam optimization. Once two transmitters are phase-aligned, next pair can be selected and so on. The faster convergence time of beamforming will enable WPT from mobile charging stations moving at higher speed.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only, and are not intended to be limiting.

REFERENCES

[1] X. Lu, P. Wang, D. Niyato, D. I. Kim and Z. Han, "Wireless Networks With RF Energy Harvesting: A Contemporary Survey," *IEEE Communications Surveys & Tutorials*, vol. 17, no. 2, pp. 757-789, Secondquarter 2015, doi: 10.1109/COMST.2014.2368999.

[2] S. Timotheou, I. Krikidis, G. Zheng and B. Ottersten, "Beamforming for MISO Interference Channels with QoS and RF Energy Transfer," *IEEE Transactions on Wireless Communications*, vol. 13, no. 5, pp. 2646-2658 May 2014, doi: 10.1109/TWC.2014.032514.131199.

[3] Y. Zeng and R. Zhang, "Optimized Training Design for Wireless Energy Transfer," *IEEE Transactions on Communications*, vol. 63, no. 2, pp. 536-550, February 2015, doi: 10.1109/TCOMM.2014.2385077.

[4] X. Chen, C. Yuen and Z. Zhang, "Wireless Energy and Information Transfer Tradeoff for Limited-Feedback Multiantenna Systems With Energy Beamforming," *IEEE Transactions on Vehicular Technology*, vol. 63, no. 1, pp. 407-412, January 2014, doi: 10.1109/TVT.2013.2274800.

[5] V. Talla, B. Kellogg, B. Ransford, S. Naderiparizi, S. Gollakota, and J. R. Smith, "Powering the next billion devices with wi-fi" *Proceedings of the 11th ACM Conference on Emerging Networking Experiments and Technologies* (CoNEXT '15). *Association for Computing Machinery*, New York, NY, USA, Article 4, 1-13. DOI: https://doi.org/10.1145/2716281.2836089

[6] J. Xu and R. Zhang, "Energy Beamforming With One-Bit Feedback," *IEEE Transactions on Signal Processing*, vol. 62, no. 20, pp. 5370-5381 Oct. 15, 2014, doi: 10.1109/TSP.2014.2352604.

[7] S. Kashyap, E. Björnson and E. G. Larsson, "On the Feasibility of Wireless Energy Transfer Using Massive Antenna Arrays," *IEEE Transactions on Wireless Communications*, vol. 15, no. 5, pp. 3466-3480 May 2016, doi: 10.1109/TWC.2016.2521739.

[8] R. Zhang and C. K. Ho, "MIMO Broadcasting for Simultaneous Wireless Information and Power Transfer," *IEEE Transactions on Wireless Communications*, vol. 12, no. 5, pp. 1989-2001 May 2013, doi: 10.1109/TWC.2013.031813.120224.

[9] R. Du, H. Shokri-Ghadikolaei and C. Fischione, "Wirelessly-Powered Sensor Networks: Power Allocation for Channel Estimation and Energy Beamforming," *IEEE Transactions on Wireless Communications*, vol. 19, no. 5, pp. 2987-3002 May 2020, doi: 10.1109/TWC.2020.2969659.

[10] X. Chen, C. Yuen and Z. Zhang, "Wireless Energy and Information Transfer Tradeoff for Limited-Feedback Multiantenna Systems With Energy Beamforming, " *IEEE Transactions on Vehicular Technology*, vol. 63, no. 1, pp. 407-412, January 2014, doi: 10.1109/TVT.2013.2274800.

[11] X. Fan, H. Ding, S. Li, M. Sanzari, Y. Zhang, W. Trappe, Z. Han, and R. E. Howard, "Energy-Ball: Wireless Power Transfer for Batteryless Internet of Things through Distributed Beamforming" *Proceedings of ACM Interact. Mob. Wearable Ubiquitous Technol.* 2, 2, Article 65, June 2018, 22 pages. DOI:https://doi.org/10.1145/3214268

[12] P. S. Yedavalli, T. Riihonen, X. Wang and J. M. Rabaey, "Far-Field RF Wireless Power Transfer with Blind Adaptive Beamforming for Internet of Things Devices," *IEEE Access, vol.* 5, pp. 1743-1752, 2017, doi: 10.1109/ACCESS.2017.2666299

[13] R. Mudumbai, B. Wild, U. Madhow, and K. N. Ramchandran, "Distributed beamforming using 1 bit feedback: from concept to realization" *Proceedings of Citeseer Allerton.*

[14] K. W. Choi, D. I. Kim and M. Y. Chung, "Received Power-Based Channel Estimation for Energy Beamforming in Multiple-Antenna RF Energy Transfer System," *IEEE Transactions on Signal Processing, vol.* 65, no. 6, pp. 1461-1476, 15 Mar., 2017, doi: 10.1109/TSP.2016.2637320.

[15] R. Wang, R. David and D. R. Brown, "Feedback rate optimization in receiver-coordinated distributed transmit beamforming for wireless power transfer," *Annual Conference on Information Sciences and Systems* (CISS), Baltimore, MD, 2015, pp. 1-6, doi: 10.1109/CISS.2015.7086865.

[16] F. Quitin, U. Madhow, M. M. U. Rahman and R. Mudumbai, "Demonstrating distributed transmit beamforming with software-defined radios," *IEEE International Symposium on a World of Wireless, Mobile and Multimedia Networks (WoWMoM)*, San Francisco, CA, 2012, pp. 1-3, doi: 10.1109/WoWMoM.2012.6263729.

[17] J. Jang et al., "A Four-Camera VGA-Resolution Capsule Endoscope System With 80-Mb/s Body Channel Communication Transceiver and Sub-Centimeter Range Capsule Localization," *IEEE Journal of Solid-State Circuits*, vol. 54, no. 2, pp. 538-549, February 2019, doi: 10.1109/JSSC.2018.2873630.

[18] H. Cho, H. Lee, J. Bae and H. Yoo, "A 5.2 mW IEEE 802.15.6 HBC Standard Compatible Transceiver With Power Efficient Delay-Locked-Loop Based BPSK Demodulator," *IEEE Journal of Solid-State Circuits*, vol. 50, no. 11, pp. 2549-2559 November 2015, doi: 10.1109/JSSC.2015.2475179.

[19] M. Kitsunezuka, H. Kodama, N. Oshima, K. Kunihiro, T. Maeda and M. Fukaishi, "A 30-MHz-2.4-GHz CMOS Receiver With Integrated RF Filter and Dynamic-Range-Scalable Energy Detector for Cognitive Radio Systems," *IEEE Journal of Solid-State Circuits*, vol. 47, no. 5, pp. 1084-1093 May 2012, doi: 10.1109/JSSC.2012.2185531.

[20] "IEEE Standard for Low-Rate Wireless Networks," *IEEE Std* 802.15.4-2015 (Revision of IEEE Std 802.15.4-2011), vol., no., pp. 1-709, 22 Apr. 2016, doi: 10.1109/IEEESTD.2016.7460875.

[21] "IEEE Standard for Information technology—Telecommunications and information exchange between systems Local and metropolitan area networks—Specific requirements—Part 11: Wireless LAN Medium Access Control (MAC) and Physical Layer (PHY) Specifications," *IEEE Std* 802.11-2016 (Revision of IEEE Std 802.11-2012) , vol., no., pp. 1-3534, 14 Dec. 2016, doi: 10.1109/IEEESTD.2016.7786995.

[22] Datasheet of Eurocan Integrated GPSDO (GPSOCXO). http://www.jackson-labs.com/assets/downloads/GP-SOCXO_Specsheet.pdf

[23] Datasheet of Laptech Precision OCXO series OS364-13. https://www.laptech.com/pdfs/OCXO_series_OS364-13_generic_data_sheet.pdf

[24] Biosketch of Aatmesh Shrivastava. https://web.northeastern.edu/ecl/wp-content/uploads/2021/01/CV_External.pdf

[25] S. Bi, C. K. Ho and R. Zhang, "Wireless powered communication: opportunities and challenges," *IEEE Communications Magazine*, vol. 53, no. 4, pp. 117-125, April 2015, doi: 10.1109/MCOM.2015.7081084.

[26] W. Henkel, G. Taubock, P. Ödling, P. O. Bröjesson, N. Petersson, and A. Johansson, "The Cyclic Prefix of OFDM/DMT An Analysis", *International Zurich Seminar on Broadband Communications*, Feb. 9-21, 2002, ETH Zurich.

[27] H. Zhou, A. V. Malipatil and Y .-Fang Huang, "Maximum-likelihood carrier frequency offset estimation for OFDM systems in fading channels," *IEEE Wireless Communications and Networking Conference,* 2006. WCNC 2006., Las Vegas, NV, 2006, pp. 1461-1464, doi: 10.1109/WCNC.2006.1696502.

[28] S. Mukherjee and S. K. Mohammed, "Low-Complexity CFO Estimation for Multi-User Massive MIMO Systems," 2015 *IEEE Global Communications Conference*

(*GLOBECOM*), San Diego, CA, 2015, pp. 1-7, doi: 10.1109/GLOCOM.2015.7417320.

[29] S. Iguchi, T. Sakurai and M. Takamiya, "A Low-Power CMOS Crystal Oscillator Using a Stacked-Amplifier Architecture," *IEEE Journal of Solid-State Circuits*, vol. 52, no. 11, pp. 3006-3017 November 2017, doi: 10.1109/JSSC.2017.2743174.

[30] S. Iguchi, A. Saito, Y. Zheng, K. Watanabe, T. Sakurai and M. Takamiya, "93% power reduction by automatic self power gating (ASPG) and multistage inverter for negative resistance (MINR) in 0.7V, 9.2 µW, 39 MHz crystal oscillator," Symposium on VLSI Circuits, Kyoto, 2013, pp. C142-C143.

[31] V. Mignone and A. Morello, "CD3-OFDM: a novel demodulation scheme for fixed and mobile receivers," *IEEE Transactions on Communications*, vol. 44, no. 9, pp. 1144-1151 September 1996, doi: 10.1109/26.536920

[32] M. K. Simon and D. Divsalar, "Doppler-corrected differential detection of MPSK," *IEEE Transactions on Communications*, vol. 37, no. 2, pp. 99-109, February 1989, doi: 10.1109/26.20075

[33] F. Qin, X. Zhan and G. Du, "Improvement of global navigation satellite system signal acquisition using different grade inertial measurement units for high dynamic applications," *IET Radar, Sonar & Navigation*, vol. 8, no. 3, pp. 233-241, March 2014, doi: 10.1049/iet-rsn.2012.0362.

[34] B. Kusý, I. Amundson, J. Sallai, P. Völgyesi, A. Lédeczi, and X. Koutsoukos, "RF doppler shift-based mobile sensor tracking and navigation," *ACM Trans. Sen. Netw.* 7, 1, Article 1 (August 2010), 32 pages. DOI:https://doi.org/10.1145/1806895.1806896.

[35] N. Shafiee, S. Tewari, B. Calhoun and A. Shrivastava, "Infrastructure Circuits for Lifetime Improvement of Ultra-Low Power IoT Devices," *IEEE Transactions on Circuits and Systems I: Regular Papers*, vol. 64, no. 9, pp. 2598-2610 September 2017, doi: 10.1109/TCSI.2017.2693181.

[36] Z. Xu, N. Mirchandani, M. A. A. Ibrahim, M. Onabajo and A. Shrivastava, "A High Efficiency DC-DC Converter Architecture with Adjustable Switching Frequency to Suppress Noise Injection in RF Receiver Front-Ends," *IEEE International Symposium on Circuits and Systems* (*ISCAS*), Sevilla, 2020, pp. 1-5, doi: 10.1109/ISCAS45731.2020.9181202.

[37] A. Shrivastava, N. E. Roberts, O. U. Khan, D. D. Wentzloff and B. H. Calhoun, "A 10 mV-Input Boost Converter With Inductor Peak Current Control and Zero Detection for Thermoelectric and Solar Energy Harvesting With 220 mV Cold-Start and −14.5 dBm, 915 MHz RF Kick-Start," *IEEE Journal of Solid-State Circuits*, vol. 50, no. 8, pp. 1820-1832 August 2015, doi: 10.1109/JSSC.2015.2412952.

[38] A. Shrivastava, D. Akella Kamakshi and B. H. Calhoun, "A 1.5 nW, 32.768 kHz XTAL Oscillator Operational From a 0.3 V Supply," *IEEE Journal of Solid-State Circuits*, vol. 51, no. 3, pp. 686-696, March 2016, doi: 10.1109/JSSC.2015.2512382.

[39] A. Shrivastava, K. Craig, N. E. Roberts, D. D. Wentzloff and B. H. Calhoun, "5.4 A 32 nW bandgap reference voltage operational from 0.5V supply for ultra-low power systems," *IEEE International Solid-State Circuits Conference-(ISSCC) Digest of Technical Papers*, San Francisco, CA, 2015, pp. 1-3, doi: 10.1109/ISSCC.2015.7062942.

[40] A. Roy et al., "A 6.45 µW Self-Powered SoC With Integrated Energy-Harvesting Power Management and ULP Asymmetric Radios for Portable Biomedical Systems," *IEEE Transactions on Biomedical Circuits and Systems*, vol. 9, no. 6, pp. 862-874, December 2015, doi: 10.1109/TBCAS.2015.2498643.

[41] S. Jeong et al., "21.6 A 12 nW always-on acoustic sensing and object recognition microsystem using frequency-domain feature extraction and SVM classification," *IEEE International Solid-State Circuits Conference* (*ISSCC*), San Francisco, CA, 2017, pp. 362-363, doi: 10.1109/ISSCC.2017.7870411.

[42] S. Hsieh and C. Hsieh, "A 0.4V 13b 270 kS/S SAR-ISDM ADC with an opamp-less time-domain integrator," *IEEE International Solid-State Circuits Conference-(ISSCC)*, San Francisco, CA, 2018, pp. 240-242, doi: 10.1109/ISSCC.2018.8310273.

[43] P. Harpe, E. Cantatore and A. v. Roermund, "A 2.2/2.7fJ/conversion-step 10/12 40 kS/s SAR ADC with Data-Driven Noise Reduction," *IEEE International Solid-State Circuits Conference Digest of Technical Papers*, San Francisco, CA, 2013, pp. 270-271, doi: 10.1109/ISSCC.2013.6487730.

[44] N. Mirchandani and A. Shrivastava, "High Stability Gain Structure and Filter Realization with less than 50 ppm/° C. Temperature Variation with Ultra-low Power Consumption using Switched-capacitor and Sub-threshold Biasing," *IEEE International Symposium on Circuits and Systems* (*ISCAS*), Florence, 2018, pp. 1-5, doi: 10.1109/ISCAS.2018.8351563.

[45] Y. Zhang, N. Mirchandani, M. Onabajo and A. Shrivastava, "RSSI Amplifier Design for a Feature Extraction Technique to Detect Seizures with Analog Computing," *IEEE International Symposium on Circuits and Systems* (*ISCAS*), Sevilla, 2020, pp. 1-5, doi: 10.1109/ISCAS45731.2020.9180802

[46] P. Nintanavongsa, U. Muncuk, D. R. Lewis and K. R. Chowdhury, "Design Optimization and Implementation for RF Energy Harvesting Circuits," *IEEE Journal on Emerging and Selected Topics in Circuits and Systems*, vol. 2, no. 1, pp. 24-33, March 2012, doi: 10.1109/JETCAS.2012.2187106.

[47] T. Ungan and L. M. Reindl, "Harvesting Low Ambient RF-Sources for Autonomous Measurement Systems," 2008 *IEEE Instrumentation and Measurement Technology Conference*, Victoria, BC, 2008, pp. 62-65, doi: 10.1109/IMTC.2008.4547005.

[48] H. Javaheri and G. Noubir, "iPoint: A Platform-Independent Passive Information Kiosk for Cell Phones," 2010 *7th Annual IEEE Communications Society Conference on Sensor, Mesh and Ad Hoc Communications and Networks* (*SECON*), Boston, MA, 2010, pp. 1-9, doi: 10.1109/SECON.2010.5508246.

[49] Datasheet of Powercast P2110 harvester chip. https://www.powercastco.com/wp-content/uploads/2016/11/p2110-datasheet-rev-b.pdf. (2017).

[50] P. Xu, D. Flandre and D. Bol, "Analysis, Modeling, and Design of a 2.45-GHz RF Energy Harvester for SWIPT IoT Smart Sensors," *IEEE Journal of Solid-State Circuits*, vol. 54, no. 10, pp. 2717-2729 October 2019, doi: 10.1109/JSSC.2019.2914581.

[51] M. A. Abouzied, K. Ravichandran and E. Sanchez-Sinencio, "A Fully Integrated Reconfigurable Self-Startup RF Energy-Harvesting System With Storage Capability," *IEEE Journal of Solid-State Circuits*, vol. 52, no. 3, pp. 704-719, March 2017, doi: 10.1109/JSSC.2016.2633985.

[52] Z. Zeng et al., "Design of Sub-Gigahertz Reconfigurable RF Energy Harvester From −22 to 4 dBm With 99.8% Peak MPPT Power Efficiency," *IEEE Journal of*

13
14

*Solid-State Circuits*, vol. 54, no. 9, pp. 2601-2613 September 2019, doi: 10.1109/JSSC.2019.2919420.

[53] Z. Hameed and K. Moez, "A 3.2 V −15 dBm Adaptive Threshold-Voltage Compensated RF Energy Harvester in 130 nm CMOS," *IEEE Transactions on Circuits and Systems I: Regular Papers*, vol. 62, no. 4, pp. 948-956, April 2015, doi: 10.1109/TCSI.2015.2413153.

[54] T. Esram and P. L. Chapman, "Comparison of Photovoltaic Array Maximum Power Point Tracking Techniques," *IEEE Transactions on Energy Conversion*, vol. 22, no. 2, pp. 439-449, June 2007, doi: 10.1109/TEC.2006.874230.

[55] G. Yu, K. W. R. Chew, Z. C. Sun, H. Tang and L. Siek, "A 400 nW Single-Inductor Dual-Input-Tri-Output DC-DC Buck-Boost Converter With Maximum Power Point Tracking for Indoor Photovoltaic Energy Harvesting," *IEEE Journal of Solid-State Circuits*, vol. 50, no. 11, pp. 2758-2772 November 2015, doi: 10.1109/JSSC.2015.2476379.

[56] K. Kadirvel et al., "A 330 nA energy-harvesting charger with battery management for solar and thermoelectric energy harvesting," *IEEE International Solid-State Circuits Conference*, San Francisco, CA, 2012, pp. 106-108, doi: 10.1109/ISSCC.2012.6176896.

[57] Vincent Liu, Aaron Parks, Vamsi Talla, Shyamnath Gollakota, David Wetherall, and Joshua R. Smith. "Ambient backscatter: wireless communication out of thin air" *In Proceedings of the ACM SIGCOMM (SIGCOMM '13)*, Association for Computing Machinery, New York, NY, USA, 39-50. DOI:https://doi.org/10.1145/2486001.2486015

[58] B. Kellogg, V. Talla, S. Gollakota, and J. R. Smith, "Passive wi-fi: Bringing low power to wi-fitransmissions," in 13*th USENIX Symposium on Networked Systems Design and Implementation (NSD*116). Santa Clara, CA: USENIX Association, March 2016, pp. 151-164.

[59] P.-H. P. Wang, C. Zhang, H. Yang, M. Dunna, D. Bharadia and P. P. Mercier, "A Low-Power Backscatter Modulation System Communicating Across Tens of Meters With Standards-Compliant Wi-Fi Transceivers," *IEEE Journal of Solid-State Circuits*, vol. 55, no. 11, pp. 2959-2969 November 2020, doi: 10.1109/JSSC.2020.3023956.

[60] Dinesh Bharadia, Kiran Raj Joshi, Manikanta Kotaru, and Sachin Katti. "BackFi: High Throughput WiFi Backscatter" *SIGCOMM Comput. Commun. Rev.* 45, 4 (October 2015), 283-296. DOI:https://doi.org/10.1145/2829988.2787490

[61] S. J. Thomas, E. Wheeler, J. Teizer and M. S. Reynolds, "Quadrature Amplitude Modulated Backscatter in Passive and Semipassive UHF RFID Systems," *IEEE Transactions on Microwave Theory and Techniques*, vol. 60, no. 4, pp. 1175-1182 April 2012, doi: 10.1109/TMTT.2012.2185810.

[62] A. Shirane et al., "RF-Powered Transceiver With an Energy- and Spectral-Efficient IF-Based Quadrature Backscattering Transmitter," *IEEE Journal of Solid-State Circuits*, vol. 50, no. 12, pp. 2975-2987 December 2015, doi: 10.1109/JSSC.2015.2454235.

[63] A. Shrivastava and B. H. Calhoun, "A 150 nW, 5 ppm/°C., 100k Hz On-Chip clock source for ultra low power SoCs," *Proceedings of the IEEE* 2012 Custom Integrated Circuits Conference, San Jose, CA, 2012, pp. 1-4, doi: 10.1109/CICC.2012.6330699.

[64] N. Mirchandani and A. Shrivastava, "A 200 nW, 25p pm/°C. Relaxation Oscillator Architecture with Program-mable Long-term and Short-term Stability using Single Gate Oxide Transistors, " *IEEE Journal of Solid-State Circuits*, under review.

[65] N. Reiskarimian, M. B. Dastjerdi, J. Zhou and H. Krishnaswamy, "18.2 Highly-linear integrated magnetic-free circulator-receiver for full-duplex wireless," *IEEE International Solid-State Circuits Conference (ISSCC)*, San Francisco, CA, 2017, pp. 316-317, doi: 10.1109/ISSCC.2017.7870388.

[66] S. Jain, A. Agrawal, M. Johnson and A. Natarajan, "A 0.55-to-0.9GHz 2.7 dB NF full-duplex hybrid-coupler circulator with 56 MHz 40 dB TX SI suppression," *IEEE International Solid-State Circuits Conference—(ISSCC)*, San Francisco, CA, 2018, pp. 400-402, doi: 10.1109/ISSCC.2018.8310353

[67] Datasheet of Pasternack Dual Junction Circulator, PE831R1017. "Dual Junction Isolator with 40 dB isolation from 2 GHz to 4 GHz, 50 Watts and SMA Female" https://www.pasternack.com/images/ProductPDF/PE83IR1017.pdf.

[68] A. Varshney, O. Harms, C. Pérez-Penichet, C. Rohner, F. Hermans, and T. Voigt "LoRea: A Backscatter Architecture that Achieves a Long Communication Range," *Proceedings of the 15th ACM Conference on Embedded Network Sensor Systems (SenSys '17)*. Association for Computing Machinery, New York, NY, USA, Article 18, 1-14. DOI:https://doi.org/10.1145/3131672.3131691

[69] N. E. Roberts et al., "26.8 A 236 nW-56.5 dBm-sensitivity bluetooth low-energy wakeup receiver with energy harvesting in 65 nm CMOS," *IEEE International Solid-State Circuits Conference (ISSCC)*, San Francisco, CA, 2016, pp. 450-451, doi: 10.1109/ISSCC.2016.7418101.

[70] K. Kaemarungsi and P. Krishnamurthy, "Properties of indoor received signal strength for WLAN location fingerprinting," *The First Annual International Conference on Mobile and Ubiquitous Systems: Networking and Services*, 2004. MOBIQUITOUS 2004., Boston, MA, USA, 2004, pp. 14-23, doi: 10.1109/MOBIQ.2004.1331706.

[71] Vamsi Talla, Mehrdad Hessar, Bryce Kellogg, Ali Najafi, Joshua R. Smith, and Shyamnath Gollakota. " LoRa Backscatter: Enabling The Vision of Ubiquitous Connectivity" *Proc. ACM Interact. Mob. Wearable Ubiquitous Technol.* 1, 3, Article 105 (September 2017), 24 pages. DOI:https://doi.org/10.1145/3130970

[72] Anechoic Chamber, Northeastern Facility. https://facilities.northeastern.edu/anechoic-chamber/

The invention claimed is:

1. A wireless power transfer (WPT) method for combining and transferring the radio frequency (RF) energy output of a network of RF energy transmitters to a remotely located energy receiver, the method comprising:

sensing, via an open-circuit rectifier of the energy receiver, received power from the RF energy transmitters, wherein the open-circuit rectifier senses the received power by producing an open-circuit voltage, the open-circuit rectifier having circuitry electrically coupled thereto, comprising an analog-to-digital converter (ADC) electrically coupled to a bandgap reference (BGR) circuit and a crystal oscillator (XO), wherein the open circuit voltage, an output of the BGR and an output of the XO are input to the ADC to produce an indication of received power; and correcting, in the RF energy transmitters, the phase and frequency offset among the RF energy transmitters based on the sensed received power.

2. The method of claim 1, further comprising generating, via a pulse generator electrically coupled to the ADC, backscattering pulses to transmit received power information to the RF energy transmitters to align transmitter phases.

3. The method of claim 1, further comprising converting the RF energy output from the RF energy transmitters to direct current (DC) using a self-biased gate (SBG) rectifier and operating the self-biased gate rectifier at a maximum power point.

4. The method of claim 1, wherein correcting the frequency offset comprises periodically changing the phase of one of the RF energy transmitters relative to another RF energy transmitter using a low-frequency (LF) oscillator.

5. The method of claim 1, wherein correcting the phase among the RF energy transmitters comprises introducing a delay to adjust a local oscillator (LO) phase in an RF energy transmitter.

6. The method of claim 1, further comprising correcting, in the RF energy transmitters, Doppler shift resulting from relative motion between the RF energy transmitters and the energy receiver.

7. The method of claim 1, wherein the open-circuit rectifier of the energy receiver and the circuitry senses the received power using less than 50 nW of power.

* * * * *